Feb. 4, 1936.   J. E. SMITH   2,029,596
AUTOMATIC COFFEE MAKER
Filed Dec. 19, 1932   2 Sheets-Sheet 1
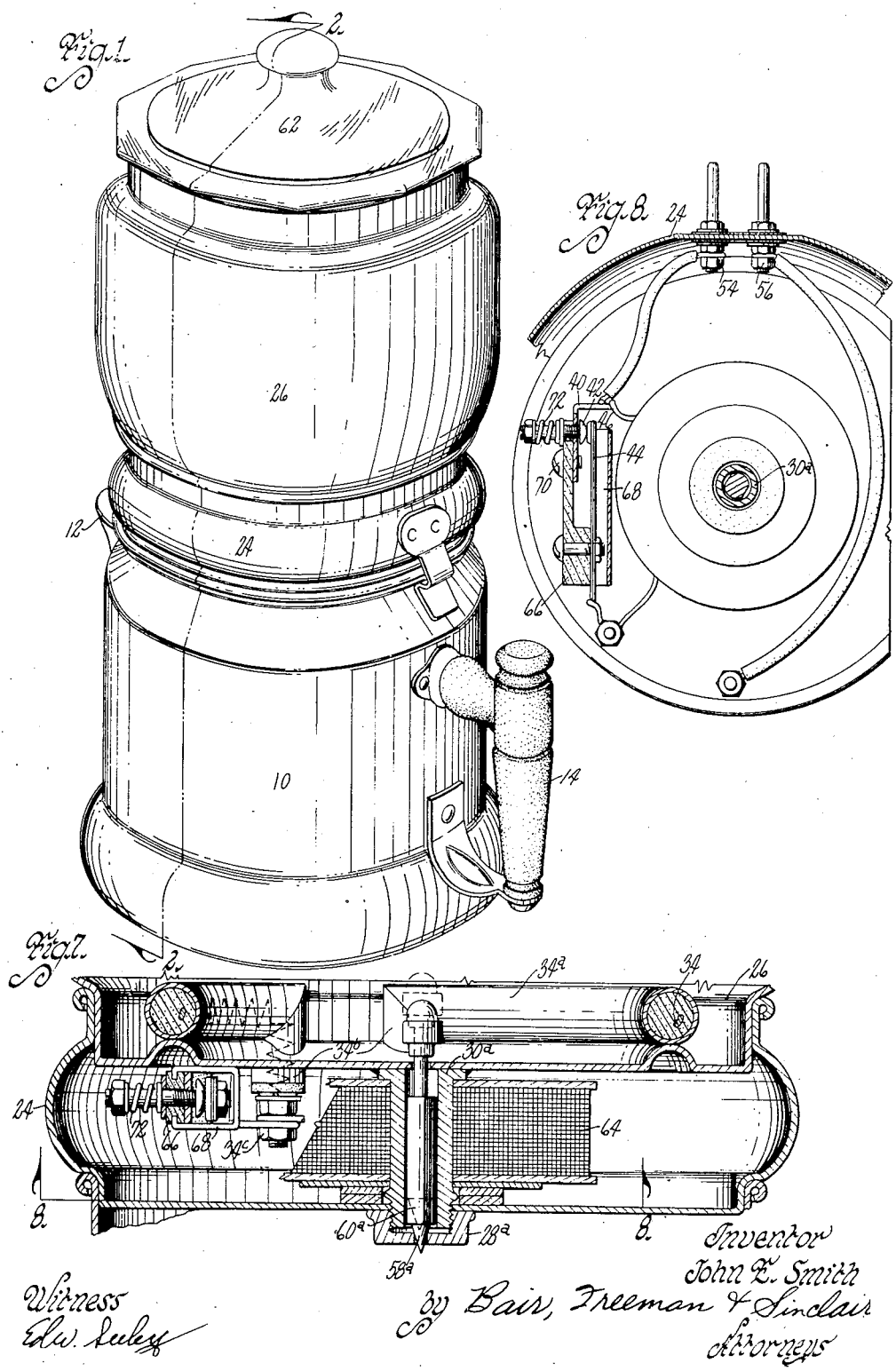

Feb. 4, 1936.    J. E. SMITH    2,029,596
AUTOMATIC COFFEE MAKER
Filed Dec. 19, 1932    2 Sheets-Sheet 2
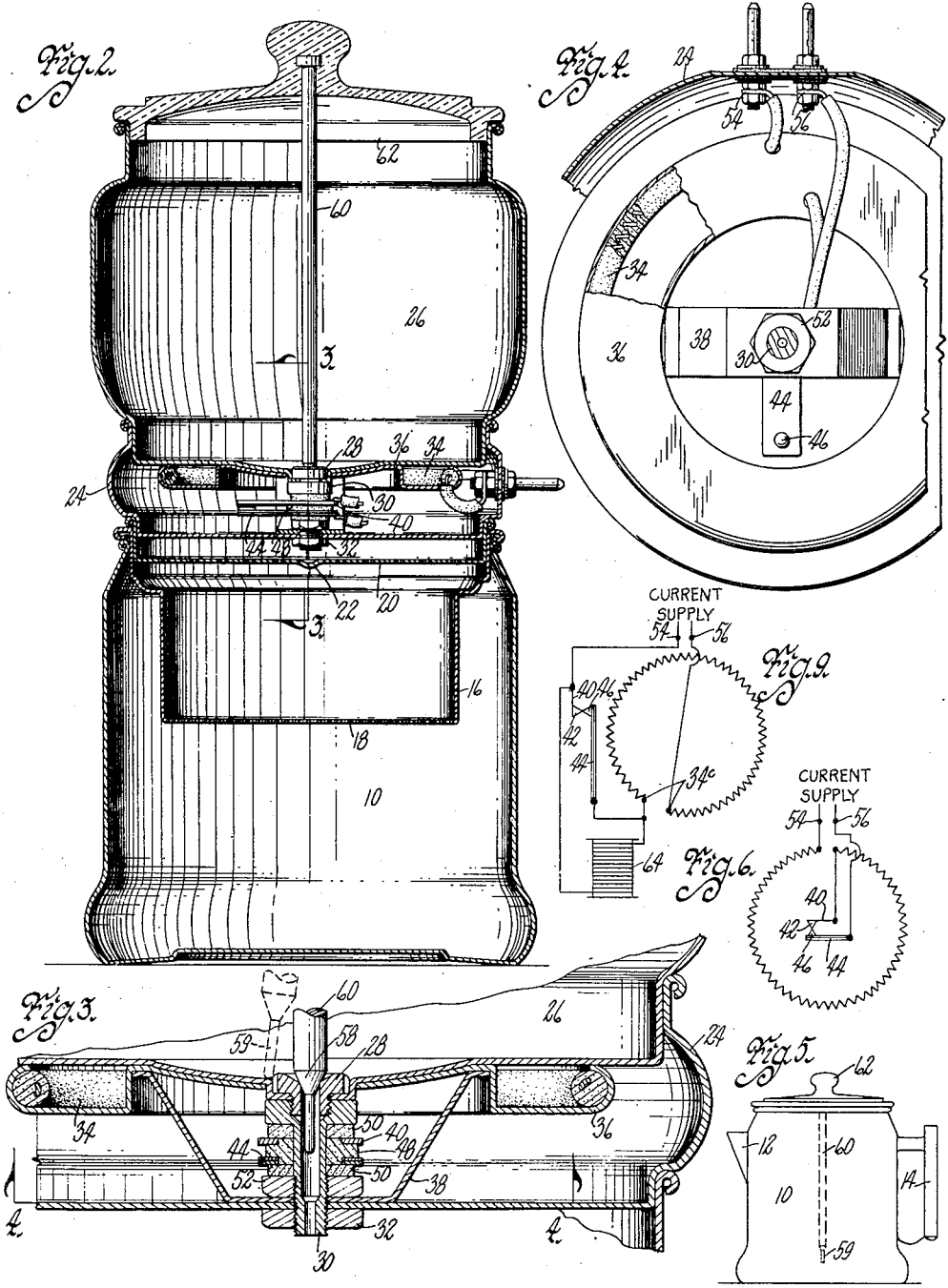

Patented Feb. 4, 1936

2,029,596

UNITED STATES PATENT OFFICE 2,029,596

AUTOMATIC COFFEE MAKER

John E. Smith, Belleville, Ill., assignor to Knapp-Monarch Company, Belleville, Ill., a corporation of Missouri Application December 19, 1932, Serial No. 647,842

2 Claims. (Cl. 53—3)

An object of my present invention is to provide a device for making coffee by the drip process, the device being in the form of an electric appliance and being comparatively simple and inexpensive to manufacture.

A further object is to provide a coffee maker comprising a liquid coffee receptacle having a coffee cup depending therein for containing ground or granulated coffee with a water receptacle above the coffee cup adapted to contain and heat water prior to introduction of the water into the coffee cup through the contents of which the water drips to produce the liquid coffee.

A further object is to provide valve means to prevent premature admission of the water to the coffee cup before the water has been heated to the necessary degree to properly make the coffee by the drip process.

Still a further object is to provide a valve plug for normally closing the valve which can be in the form of a stem secured to the lid of the water receptacle and disengageable from the valve seat when the lid is removed, or can be in the form of a combination armature and valve plug which can be opened by a solenoid or the like.

Still a further object is to provide thermostatic means for controlling the supply of electric current to the heating element for the water in the water receptacle.

Still another object is to provide a solenoid for opening the valve connected with the thermostat so as to be automatically controlled thereby, the thermostat being responsive to the temperature of the water being heated in the water receptacle.

Further objects are to provide novel means for securing the heating element and other parts of the construction together and for supporting the thermostat.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a coffee maker embodying my invention.

Figure 2 is a vertical sectional view of the same on the line 2—2 of Figure 1.

Figure 3 is a sectional view on the line 3—3 of Figure 2 showing the parts on an enlarged scale.

Figure 4 is a sectional view on the line 4—4 of Figure 3 showing a bottom plan view of parts of the device.

Figure 5 is a side elevation showing the lid on the water receptacle in Figure 2 mounted on the liquid coffee receptacle.

Figure 6 is a diagrammatic view of the wiring for the preceding figures.

Figure 7 is a sectional view similar to Figure 3 showing a modified construction.

Figure 8 is a sectional view on the line 8—8 of Figure 7; and

Figure 9 is an electrical diagrammatic view of the form of invention shown in Figures 7 and 8.

On the accompanying drawings, I have used the reference numeral 10 to indicate a liquid coffee receptacle. It has a spout 12 and a handle 14 for convenience in pouring and handling the receptacle 10.

Depending within and removable from the liquid coffee receptacle 10, is a coffee cup 16. It has a bottom 18 provided with a great number of small perforations. Frictionally mounted in the coffee cup 16 is a spreader plate 20. It is also perforated but the perforations are larger and there are not so many of them. The spreader plate 20 has a depression 22 at its center.

Frictionally received in the spreader plate 20 (which is of cup-like formation as clearly shown in Figure 2) is a housing 24. A water receptacle 26 extends into the housing 24 and is secured thereto as will now be described.

A valve seat element 28 is associated with the bottom of the water receptacle 26 (see Figure 3). It is secured in position by being screwed into a sleeve member 30. The sleeve member is threaded to receive a nut 32. The nut holds the housing 24 in assembled relation to the water receptacle 26.

Against the bottom of the water receptacle 26 I provide a heating element 34 in the form of a coil of resistance wire imbedded in argillous material. A heating element casing 36 is provided for the heating element 34.

The casing 36 is retained in position against the bottom of the receptacle 26 by a spacer 38 which is interposed between the casing and the housing 24. It is perforated for the sleeve 30 to extend through.

On the sleeve 30 I provide a stationary spring 40 having a contact 42 and a thermostatic bar 44 having a contact 46. These are mounted on an insulating sleeve 48 and between insulating washers 50, all of which are retained in assembled position on the sleeve 30 by a nut 52.

As shown in Figure 6, one end of the heating element 34 is connected with the spring 40 and the other end is connected with a contact prong 54. A second contact prong 56 is connected with the thermostatic bar 44, thus placing the thermostat in series with the heating element 34. The prongs 54 and 56 are adapted to coact with the socket member of an appliance cord in the ordinary manner.

A valve plug 58 is provided for the valve seat 28. The plug is on the lower end of a stem 60 which is connected with a cover 62. The cover 62 is adapted to fit either the receptacle 26 or the receptacle 10. When in position on the receptacle 26, it is slightly spaced from the upper edge thereof, as shown in Figure 2, so that the plug 58 is held by the weight of the cover against the valve seat 28.

In the modified construction of Figures 7, 8 and 9, the heating element 34, prongs 54 and 56 and spring and thermostat 40 and 44 are used, but a solenoid 64 is connected in the circuit for automatically disengaging a valve plug 58a from a valve seat element 28a. As shown in Figure 7, the assembly of the housing 24 relative to the receptacle 26 is slightly different. A sleeve 30a is welded or otherwise secured to the bottom of the receptacle 26 and the valve seat member 28a takes the place of the nut 32 in Figure 3. The solenoid 64 surrounds the sleeve 30a. A valve stem 60a in Figure 7 is of magnetic material such as iron, so that it forms an armature to be attracted by the solenoid coil 64 when it is energized for thus lifting the valve plug 58 from its seat.

The thermostat 44 is mounted differently than in Figure 3. It is carried by an insulating block 66 which in turn is supported by a casing 68. The spring 40 is secured to the block 66 by a screw 70. The contact 42 is screw-threaded through the spring 40 and thereby adjustable relative thereto. A spring 72 serves the purpose of retaining the contact 42 in adjusted position.

The heating element 34 is imbedded in a casing 34a and the casing is mounted inside the receptacle 26. Ends 34b are provided which extend through the bottom of the receptacle 26 and have terminals 34c.

The coil of the solenoid 64 is shunt connected with the thermostat, as shown in Figure 9. Therefore, when the thermostat opens, current will flow through the heating element and through the solenoid. The solenoid being formed of a great number of turns of fine wire permits but very little current to flow through the heating element and thus keeps the water in the receptacle 26 warm but does not heat it above the predetermined degree for which the thermostat is set.

*Practical operation*

In the operation of the coffee maker shown in Figures 1 to 6 inclusive, the unit consisting of the receptacle 26, cover 62, housing 24 and spreader plate 20 are removed from the receptacle 10 whereupon the desired quantity of granulated coffee may be placed in the coffee cup 16. The removed unit may then be replaced and the cover 62 removed. The proper quantity of water may then be poured into the receptacle 26 whereupon the cover 62 should be immediately replaced to prevent more than a few drops of water from flowing past the valve seat 28. The prongs 54 and 56 are then connected with a source of current supply whereupon the heating element 34 will be energized for heating the water in the receptacle 26.

The heat of the water will be transmitted through the bottom of the receptacle 26, the sleeve 30 and the heating element casing 36 to the space in the housing 24 surrounding the thermostatic bar 44.

At a predetermined temperature of the water, the bar will have warped sufficiently to separate the contacts 42 and 46, thus preventing the water from becoming hotter than a predetermined temperature.

After the thermostat has operated, the cover 62 may be lifted for raising the valve plug 58 from the valve seat 28 and an extension 59 may then be adjusted to the dotted line position of Figure 3 to retain the valve in open position. The heated water will flow into the depression 22 of the spreader plate 20 and be spread too by the plate to drip evenly over the coffee in the cup 16. It will slowly flow through the coffee and drip from the perforations in the bottom 18. At the time the cover 62 is lifted, the source of current should be disconnected because there is no need of further heat if the coffee is consumed within a reasonable period of time.

After the drip process has been completed, the coffee 16 and all parts thereof may be removed from the receptacle 10 and the lid 62 placed thereon, as shown in Figure 5, so that the receptacle 10 can be used as a pouring pot for the liquid coffee.

In the operation of the form of invention shown in Figures 7, 8 and 9, the coffee and water are placed in the cup 16 and the receptacle 26 respectively and the heating element 34 is energized. When the temperature of the water causes the thermostat 44 to operate, the solenoid 64 will be thrown into the circuit for automatically opening the valve 58a.

The valve will remain open until the operator disconnects the electric circuit which of course should not be done until after all the water has flowed through the valve. The slight amount of current flowing through the heating element 34 while the solenoid 64 is energized serves to maintain the water in the receptacle 26 at the temperature to which it was heated while it is flowing through the valve seat 28a.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an automatic coffee maker, a liquid coffee receptacle, a perforated coffee cup thereabove for holding granulated coffee, a water receptacle above said coffee cup, a passageway for providing communication between said water receptacle and said coffee cup, a normally closed valve in said passageway, electro-responsive means for opening said valve when said means is energized, an electric heater element for said water receptacle, current supply terminals, and a temperature responsive switch responsive to the temperature of the water in said water receptacle rising to a predetermined degree, whereupon said switch completes the circuit from said terminals through said electro-responsive means whereby to fully open said valve and retain it fully opened upon such predetermined degree of temperature being reached, said heating element and temperature responsive switch being connected in series between said terminals and said electro-responsive means being connected in shunt with said switch whereby upon opening of said switch due to said temperature rise, said heating element and said electro-responsive means are connected in series.

2. In an automatic coffee maker, a liquid coffee receptacle, a perforated coffee cup thereabove for holding granulated coffee, a water receptacle above said coffee cup, electro-responsive means for discharging heated water from said water receptacle to said coffee cup, an electric heater element for said water receptacle and a temperature responsive switch responsive to the temperature of the water in said water receptacle rising to a predetermined degree whereupon said switch completes the circuit to said electro-responsive means whereby to discharge said heated water to said coffee cup upon such predetermined degree of temperature being reached, said heating element and temperature responsive switch being connected in shunt with said electro-responsive means whereby upon opening of said switch due to said temperature rise, said heating element and said electro-responsive means are connected in series.

JOHN E. SMITH.